(12) United States Patent
Ollive et al.

(10) Patent No.: US 7,249,172 B2
(45) Date of Patent: Jul. 24, 2007

(54) SYSTEM FOR REMOTELY LOADING AND REMOTELY MAINTAINING AN ELECTRONIC CARD

(75) Inventors: Michel Ollive, Nice (FR); Alain Carpine, Valbonne (FR); Pascal Chapier, Valbonne (FR); Jean-Luc Molinard, Vence (FR)

(73) Assignee: Schneider Automation, Valbonne (FR)

( * ) Notice: Subject to any disclaimer, the term of this patent is extended or adjusted under 35 U.S.C. 154(b) by 816 days.

(21) Appl. No.: 10/289,347

(22) Filed: Nov. 7, 2002

(65) Prior Publication Data

US 2003/0101042 A1 May 29, 2003

(30) Foreign Application Priority Data

Nov. 8, 2001 (FR) ................................. 01 14576

(51) Int. Cl.
*G06F 15/167* (2006.01)
*G06F 15/173* (2006.01)
*G01R 31/28* (2006.01)
*G06F 19/00* (2006.01)

(52) U.S. Cl. .................. 709/223; 709/212; 714/226; 714/227; 714/228

(58) Field of Classification Search ............. 714/25–30
See application file for complete search history.

(56) References Cited

U.S. PATENT DOCUMENTS

| | | | |
|---|---|---|---|
| 5,636,227 A * | 6/1997 | Segars ........................ 714/729 |
| 5,869,980 A | 2/1999 | Chu et al. |
| 5,898,704 A * | 4/1999 | Kawano ...................... 714/729 |
| 5,978,578 A | 11/1999 | Azarya et al. |
| 6,134,707 A | 10/2000 | Herrmann et al. |
| 6,259,271 B1 * | 7/2001 | Couts-Martin et al. ..... 714/725 |
| 6,286,114 B1 | 9/2001 | Veenstra et al. |
| 6,393,591 B1 * | 5/2002 | Jenkins et al. .............. 714/725 |
| 6,598,193 B1 * | 7/2003 | Li et al. ...................... 714/727 |
| 6,807,644 B2 * | 10/2004 | Reis et al. ................... 714/724 |
| 6,983,441 B2 * | 1/2006 | Wescott ........................ 716/17 |
| 7,095,718 B1 * | 8/2006 | Terry ........................... 370/241 |
| 2002/0062461 A1 * | 5/2002 | Nee et al. ..................... 714/28 |
| 2002/0121913 A1 * | 9/2002 | Miller et al. ................. 324/760 |

FOREIGN PATENT DOCUMENTS

EP        0 511 752 A1    11/1992

* cited by examiner

*Primary Examiner*—Zarni Maung
*Assistant Examiner*—Hassan Phillips
(74) *Attorney, Agent, or Firm*—Oblon, Spivak, McClelland, Maier & Neustadt, P.C.

(57) ABSTRACT

This invention is a system for remotely loading and remotely maintaining an electronic card (5) belonging to automation equipment and comprising a minimum of a processing unit (31), an internal bus (30) and a resources controller (10) which has one or more JTAG interface registers (42, 43) accessible for reading/writing by a JTAG server (50) that is external to the automation equipment. The resources controller (10) contains a status engine (11) capable of interpreting and carrying out instructions stored in one or more of the JTAG interface registers (43) and able to use the resources (21a, 21b, 21i) managed by the resources controller (10) and shared with the processing unit (31), without the intervention of the processing unit (31).

12 Claims, 1 Drawing Sheet

SYSTEM FOR REMOTELY LOADING AND REMOTELY MAINTAINING AN ELECTRONIC CARD

BACKGROUND OF THE INVENTION

This invention relates to a system for remotely loading and remotely maintaining an electronic card belonging to automation equipment and comprising a minimum of an interface component complying with the JTAG Standard. Such a system can be applied to any automation application in the area of industrial automation processes, building automation or the monitoring/control of electronic distribution networks in particular. The invention equally involves automation equipment comprising an electronic card supporting such a system for remote loading and remote maintenance.

Automation equipment refers hereafter, for example, to a programmable logic controller, a numerical control, a monitoring/control station, a dedicated module or an Input/Output module of a programmable logic controller, a dialogue terminal, a speed controller, and also to any equipment or module capable of running a program so as to provide one or more automation functions in an automation application. Automation equipment includes electronic cards that now often incorporate complex integrated circuits, such as ASIC cards. This integration presupposes the capability of making increasingly more advanced diagnoses of electronic cards. The automation equipment monitors and controls automation applications for which any down-time is sometimes very harmful. That is why there is an increasing demand for knowledge of the functional state of the automation equipment at any time, for safety and productivity reasons in particular.

Since automation equipment is usually installed at a remote site, a remote diagnosis function can prove to be vital in detecting a breakdown or foreseeing any malfunction in an electronic card or making any corrections remotely. However, during this diagnosis, sometimes it is essential not to disrupt the processing unit of an electronic card that is running a program that monitors/controls the automation application, which could alter the response time or the cycle times at the level of the automation application in particular. This is why remote diagnosis must be able to be carried out without interfering with the program(s) which the processing unit is running. Any diagnosis must also be possible even when the processing unit of the electronic card is not functioning, for example in the event of physical breakdown of the processing unit or in the event of a fault in the operating system of the processing unit.

Moreover, during the manufacture of an electronic card, it is particularly advantageous to be able to quickly remotely load programs to the factory, such as firmware, into some of the electronic card memories, for example FLASH type memories, when the processing unit of the electronic card is not yet operational. These possibilities simplify the manufacturing processes since these types of programs then only have to be installed at the time of manufacture of the electronic card thus avoiding having to store already programmed memories in any intermediate way. Moreover, as the software contained in the FLASH memories may be updated (improvements in functionality, corrections of anomalies), it will be necessary, at such a time, to update the already programmed stored memories. Hence, there is an advantage in blank storing them on electronic cards then loading the software at the last moment with the up-to-date version.

Finally, while running automation equipment at a remote site, a remote maintenance system can advantageously provide a remote loading function especially for making corrections or applying updates or new versions of programs.

The IEEE (Institute of Electrical and Electronics Engineers) has adopted the IEEE1149.1 Standard (IEEE Standard Test Access Port and Boundary Scan Architecture), also called the JTAG Standard (Join Test Action Group), to define an in situ standard test for integrated circuits or complex components of an electronic card that do not have physical access to equipotentials. Such a test may be carried out on cards that have functionally broken down as it uses very limited resources that are different (specific to the JTAG) from those used for the functioning of the card. To do that, each component to be tested in conformity with this JTAG Standard must have an access port (TAP: Test Access Port) made up of five specific signals including an input tab (TDI) and an output tab (TDO), as well as a Boundary Scan which allows the simulation of all the inputs/outputs of the component by serialising them through this Boundary Scan.

The document EP0511752 describes an integrated JTAG circuit that has an optional interface register (TDR: Test Data Register). This integrated JTAG circuit is mounted on an electronic card comprising a processing unit and an internal bus. The TDR interface register is a Boundary Scan which can be read and written serially by an external JTAG Server by means of signals complying with the JTAG Standard but the TDR interface register also has the special feature of being able to be loaded or downloaded in parallel into a double memory port of the integrated circuit. The information contained in the TDR interface register is then easily accessible to the processing unit of the electronic card in this double memory port via the internal bus. It is therefore possible, to prompt requests which will be loaded into a memory of the electronic card from an external JTAG Server and which can be run by the processing unit (for example, requests to READ, WRITE, RUN, STOP, . . . ) and thus exchange information between an external server and the processing unit.

This solution then allows you to run auto tests remotely and make diagnoses remotely, so long as the processing unit of the electronic card is operational and can run a basic program. Nevertheless, these functionalities do not allow e software to be remote loaded into a memory of the electronic card while the processing unit of the electronic card is not operational. Furthermore, any request or instruction from an external JTAG Server to carry out a remote diagnosis will interfere with the functioning of the processing unit insofar as this solution uses run capabilities of the processing unit, which can harm some applications, especially real-time automation applications.

BRIEF SUMMARY OF THE INVENTION

This invention therefore is intended to overcome these problems. As a result of the system described in the invention, it will be possible, from a JTAG Server, to remotely load information into the memory of an electronic card or to make a remote diagnosis of an electronic card without the processing unit of this electronic card needing to be out of operation. Similarly it will be possible to make a non-disruptive diagnosis without impacting on the running of a program run by the processing unit of the electronic card.

Another aim of the invention is to be able to access these functions of remote loading and remote maintenance from client equipment, using Internet technology.

For this purpose, the invention depicts a system for remotely loading and remotely maintaining an electronic card belonging to automation equipment, comprised of at least a processing unit, an internal bus and a resources controller which has one or more JTAG interface registers accessible in reading and writing by a JTAG Server external to the automation equipment by means of signals complying with the JTAG standard. According to the invention, the resources controller contains a status engine which is able to Interpret and run instructions memorised in the JTAG interface register(s) and which can access the resources managed by the resources controller, without the intervention of the processing unit of the electronic card, in order to remotely load and remotely maintain the electronic card. The status engine communicates with resources shared by the processing unit of the electronic card that are accessible via a peripheral bus monitored by the resources controller. The status engine is capable of writing information relating to the automation equipment to the JTAG interface register(s).

According to one characteristic, the resources controller includes methods of priority management to give the processing unit priority access to resources shared between the processing unit and the status engine.

According to another characteristic, the JTAG server includes a server function of at least one upstream protocol, in order to communicate across a TCP/IP Global network or Wide area network with client equipment with the upstream protocol. The JTAG server has a central unit connected to a downstream linked interface managing a downstream communication port in order to communicate with the electronic card in accordance with the JTAG standard and with an upstream linked interface managing a connection to the Global TCP/IP. The central processing unit of the JTAG server runs a conversion program that can interpret IP messages from the upstream linked interface to generate JTAG frames for the downstream linked interface to send, and can interpret JTAG frames from the downstream linked interface to generate IP messages for the upstream linked interface to send.

BRIEF DESCRIPTION OF THE DRAWINGS

Other characteristics and advantages will be explained in the detailed description which follows, by reference to an embodiment given as an example and represented by the attached drawings where.

DETAILED DESCRIPTION OF THE INVENTION

Figure 1:
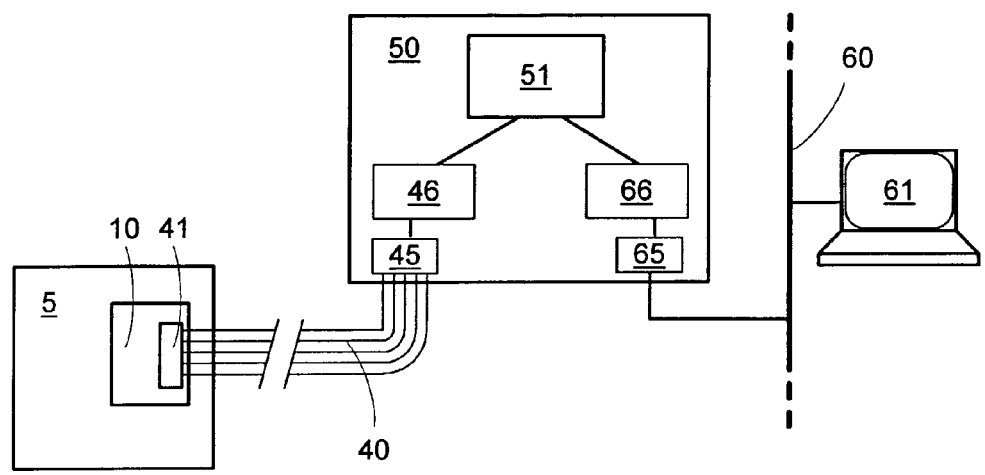
FIG. 1 represents the general architecture of a system for remotely loading and remotely maintaining an electronic card in conformity with the invention, FIG. 2 details the architecture of an electronic card comprising a system in accordance with FIG. 1.
Figure 2:
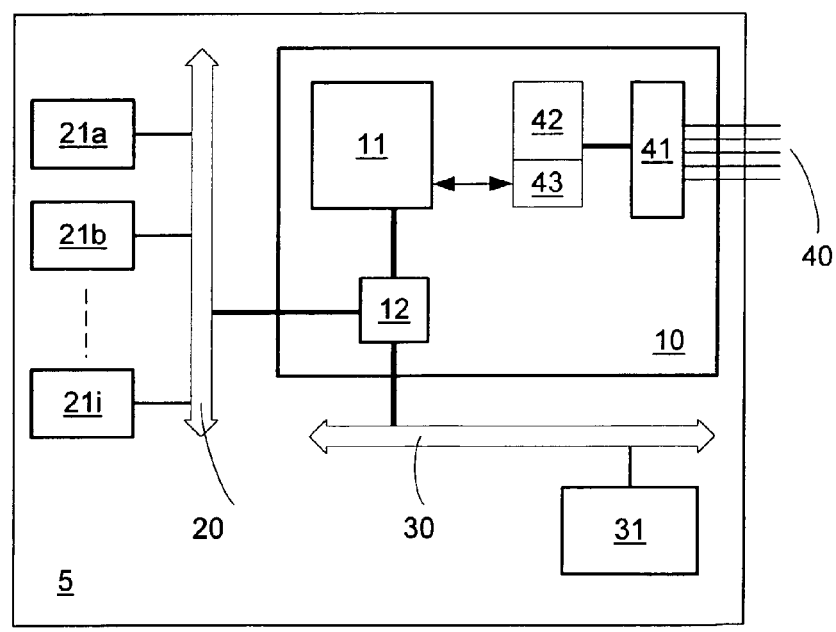

With reference to FIG. 2, an electronic card 5 belonging to automation equipment includes a resources controller (commonly called CHIPSET) 10 which communicates with at least a processing unit 31 via a bus 30 within the electronic card 5. The one shown as an example has a processing unit 31 separate from the resources controller 10. You can also see in a similar way that the resources controller 10 and the processing unit 31 may be integrated in one and the same electronic component.

In the traditional way, the resources controller 10 is essentially responsible for managing access to a group of resources, 21a, 21b, 21i, to which it is connected by a peripheral bus 20, therefore saving the processing unit 31 from having to perform this task. These resources 21a, 21b, 21i include, for example, memorisation facilities such an active RAM type active memory, a read only type FLASH or EPROM memory, or a PCMCIA memory card and peripherals such as an interface for external communication (serially linked USB, UART controllers, network interfaces), an interface to the backplane of the automation equipment, dialogue facilities such as mice, keyboards, LEDs, etc . . . The processing unit 31 may access one or more of these resources 21a, 21b, and 21i for reading or writing at any time.

Furthermore, the resources controller 10 could manage access to a special cache memory type resource by means of another specific bus (not shown in the diagrams) to ensure that the processing unit 31 has quick access to this special resource. Moreover, the resources 21a, 21b, 21i can also be processing units managed by the resources controller 10.

According to an alternative embodiment, it is likewise envisaged that the electronic card 5 has several processing units 31 connected to one or more internal buses 30, the resources controller 10 therefore being responsible for managing in parallel access to the different resources 21a, 21 b, and 21i for all of these processing units 31.

The processing unit 31 runs a machine-intimate, operating system type program memorised in a FLASH memory 21a. The processing unit 31 runs an application program or a part of an application program memorised in a RAM memory 21b, with the aim of carrying out monitoring/control functions in an automation application, for example. The RAM memory 21b also serves to store the different data relating to the automation equipment (status, functional states, etc . . . ) and the automation application (variables, measurements, instructions, states, faults, etc . . . ).

The resources controller 10 includes an access port (TAP) 41 allowing it to communicate externally of the automation equipment, particularly with an external JTAG Server 50, with the help of five signals 40 in conformity with the JTAG standard: TDI (Test Data Input), TDO (Test Data Output), TMS (Test Mode Signal), TCK (Test Clock), TRST (Test Reset). In the resources controller 10, the access port 41 is connected with standard registers 42 in accordance with the JTAG standard and, in particular, an identification register, an instruction register and a "Boundary Scan" register used to simulate the various inputs/outputs of a component. The resources controller 10 also has at least an optional JTAG interface register, in conformity with the JTAG standard, hereafter referred to as buffer register 43. This buffer register 43, which is connected to the access port 41, can at the very least store a memory address and at least some data. According to a preferred embodiment, the buffer register 43 is a FIFO register comprising n locations of n bits.

According to the invention, the resources controller 10 also includes a status engine 11 which is linked to the buffer register 43. The status engine 11 is capable of interpreting and running instructions which are read in the buffer register 43 and sent by a JTAG server 50. It is also capable of writing information in the buffer register 43, for sending to a JTAG server 50. For example, the status engine 11 is capable of interpreting and running instructions such as: "Read Byte", "Write Byte", "Read Word", "Write Word", "Read Status", etc . . . While running the instructions read in the buffer register 43, the status engine 11 may need to access one or more of the resources 21a, 21b, and 21i of the electronic card 5. These resources 21a, 21b, 21i may be shared with the processing unit 31. To access the resources 21a, 21b, 21i, the status engine 11 is designed not to use the processing unit 31, but uses direct access to the peripheral bus 20 of the resources controller 10, without the intervention of the processing unit 31. By not using the capacities of the processing unit 31 the status engine does not affect the running of a program run in the processing unit 31.

Nevertheless, it is also important not to slow down the speed with which the processing unit 31 accesses the peripheral bus 20. That is why the resources controller 10 includes priority management facilities 12. These facilities 12 have the task of managing access priorities to the peripheral bus 20 between the processing unit 31 and the status engine 11. According to one characteristic of the invention, when a simultaneous request for access to the peripheral bus 20 is made by the processing unit 31 and the status engine 11, priority management facilities 12 give priority to the processing unit 31 in order to avoid any slow-down in its access to the peripheral bus 20.

The status engine 11 can thus directly access the resources on the electronic card allowing for example the programming of the FLASH memory 21a, or the reading and writing of information relating to the automation equipment into the random access memory 21b, etc . . . Thus you can prompt the status engine 11 in order to ask it to read or write information directly onto an electronic card 5 of automation equipment, thus authorising the functions of remote loading and/or remote diagnosis, from an external JTAG server 50. To increase the speed of transfer when remote loading, the system advantageously implements a favourable "Burst" mode, that is, a mode that auto-increments addresses: a start address is transmitted at the start; the data is then transmitted and the status engine 11 then writes to the successive addresses.

The JTAG server 50 is a piece of computer hardware, for example a PC type computer, which has at least a central processing unit 51. This central processing unit 51 can run a program which can send or receive JTAG frames in conformity with the JTAG standard by means of signals 40. To communicate with the electronic card 5 according to the JTAG protocol, the central processing unit 51 uses a downstream linked interface 46 managing a downstream communications port 45 capable of managing the signals 40. According to an economical embodiment, the downstream communications port 45 of the JTAG server 50 is an input-output port capable of transmitting logic signals. If the JTAG server 50 is a PC type computer, the downstream communications port 45 will be, for example, the parallel port.

Another aim of the invention is to be able to use Internet protocols to put into operation the system described in the invention. TELNET is a protocol allowing you to connect to a remote device as a user of the remote device. This then makes it possible, from a local station called the TELNET client, to access a remote device, called the TELNET server, using a global network or wide area network (WAN) such as the Internet, Intranet or Extranet, in accordance with the TCP/IP standard (Transport Control Protocol/Internet Protocol) or the UDP/IP standard. Such a network will be called a "TCP/IP network" in the follow up statements. FTP (File Transfer Protocol) is a protocol that can be used by users to exchange files over a TCP/IP Network. Using the FTP protocol, an FTP client can communicate with an FTP file server to access a file remotely for reading or writing.

The JTAG server 50 is linked to a TCP/IP Network 60 by means of a network port 65. To communicate over the TCP/IP Network, the central processing unit 51 uses an upstream linked interface 66 and integrates a program capable of carrying out a server function using at least an upstream protocol standard, such as the TELNET, FTP, GDB (GNU Debugger) protocols or others, to communicate over the TCP/IP Network 60 with remote client equipment 61 with the upstream protocol by means of messages in accordance with the IP protocol. Using such a standard protocol has the advantage of not having to develop client specific functionality in the remote equipment 61.

Thus it is beneficial to have the possibilities given by the TCP/IP Network to put into operation a system of remote loading and remote maintenance in conformity with the invention. To do that the JTAG server 50 has a conversion program run by the central processing unit 51, that can interpret IP messages (particularly containing standardised TELNET or FTP commands) coming from the upstream linked interface 66 to generate JTAG frames to be sent by the downstream linked interface 46 and capable of interpreting JTAG frames coming from the downstream linked interface 46 to generate IP messages to be sent by the upstream linked interface 66 to the TCP/IP Network 60. The FTP protocol will be therefore especially suitable for the remote loading of files, such as an operating system, onto the electronic card 5 from the client equipment 61 connected to the TCP/IP Network 60, whereas the TELNET protocol will be especially suitable for making remote diagnoses of the electronic card 5 from the client equipment 61.

Without departing from the scope of the invention, other variations and improvements of these features may be made and the use of envisaged equivalent methods used even.

The invention claimed is:

1. A system for remotely loading and remotely maintaining an electronic card belonging to automation equipment, comprising:

the electronic card comprising a processing unit, an internal bus and a resources controller with one or more Joint Test Action Group (JTAG) interface registers accessible for reading and writing by a JTAG server external to the automation equipment, via signals in conformity with the JTAG Standard, wherein, the resources controller contains a status engine configured to interpret and run instructions stored in the one or more JTAG interface registers and which can access a plurality of resources managed by the resources controller to perform remote loading and remote maintenance of the electronic card (5), and wherein the processing unit is configured to not intervene in the remote loading and remote maintenance of the electronic card performed by the resources controller.

2. The system of claim 1, wherein the status engine is configured to communicate with each of the plurality of resources shared with the processing unit of the electronic card which are accessible via a peripheral bus monitored by the resources controller.

3. The system of claim 2, wherein the resources controller comprises priority management facilities which give the processing unit priority access to the plurality of resources shared between the processing unit and the status engine.

4. The system of claim 3, wherein the shared resources include at least a random access memory of the electronic card.

5. The system of claim 3, wherein the shared resources include a FLASH memory of the electronic card.

6. The system of claim 1, wherein
the status engine is configured to write information relating to the automation equipment to the one or more of the JTAG interface registers.

7. The system of claim 1, wherein
the JTAG server includes a server function comprised of at least one upstream protocol in order to communicate over a TCP/IP Global network or Wide area network (WAN) with a client equipment with the upstream protocol.

8. The system of claim 7, wherein
the JTAG server comprises a central processing unit linked to a downstream linked interface configured to manage a downstream communications port so as to communicate with the electronic card in conformity with the JTAG Standard and to an upstream linked interface configured to manage a connection to the TCP/IP Global network or Wide area network (WAN) wherein
the central processing unit of the JTAG server is configured to run a conversion program capable of interpreting IP messages from the upstream linked interface to generate JTAG frames which the downstream linked interface will send, and which can interpret JTAG frames from the downstream linked interface to generate IP messages which the upstream linked interface will send.

9. The system of claim 8, wherein
the downstream communications port of the JTAG server is a parallel port.

10. The system of claim 8, wherein
the upstream protocol is an FTP protocol.

11. The system of claim 8, wherein
the upstream protocol is a TELNET protocol.

12. Automation equipment comprising one or more electronic cards supporting a system for remote loading and remote maintenance according to one of the preceding claims.

* * * * *